Patented Oct. 25, 1932

1,884,164

UNITED STATES PATENT OFFICE

DONALD F. OTHMER, OF ROCHESTER, NEW YORK, ASSIGNOR TO EASTMAN KODAK COMPANY, OF ROCHESTER, NEW YORK, A CORPORATION OF NEW YORK

COMPOSITION FOR REMOVING SURFACE FINISHES

No Drawing.   Application filed June 10, 1930.  Serial No. 460,289.

This invention relates generally to removal from a surface of a previously applied finish such, for instance, as varnishes, paints, enamels, shellacs, gums, lacquers, etc., whereby the treated surface is restored to its original condition thus fitting it for the application of a new finish. More particularly my invention relates to such surface removers containing beta-beta' dichlorethyl ether.

The old methods for removing varnish or other finishes from surfaces such, for instance, as woodwork preparatory to refinishing them, involves generally the slow and tedious process of scraping the finish from the surface by means of a sharp edge or by heating the surface with a blow torch or other means. So-called varnish removers have in a large measure replaced these old methods of removing surfaces; these varnish removers are generally applied to the surface, allowed to stand thereon for a limited time during which period the varnish remover attacks the varnish or other surface, loosening it to a sufficient degree so that it may be readily scraped therefrom.

The varnish removers which are at present employed comprise generally a plurality of solvents of more or less low volatility and some substance such as paraffin to prevent the too rapid vaporization of the solvents when they have been applied to the surface being treated. The paraffin or like acting substance which is usually present in the varnish remover has no purpose other than that of holding the volatile solvating liquid in contact with the surface as long as possible. It has no solvating action per se upon the surface.

An object of the present invention is to provide a new composition of matter. Another object of this invention is to provide a new type of varnish remover having new and unusual characteristics. A further object of this invention is to provide a varnish remover containing ingredients all of which have solvating action on the surface being removed. A still further object of this invention is to provide a solvent remover containing beta-beta' dichlorethyl ether. Other objects will hereinafter appear.

Beta-beta' dichlorethyl ether has the structural formula

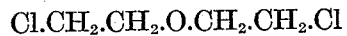

It is a colorless liquid boiling at 65-67° C. under 15 mm. pressure.

I have found that the substitution of beta-beta' dichlorethyl ether in whole or in part for the paraffin or equivalent material in solvent mixtures having the property of removing paints, varnishes, lacquers, etc., considerably improves these solvent combinations. The beta-beta' dichlorethyl ether has a decided solvent action upon most finished surfaces, and, moreover, this high boiling ether prevents rapid evaporation for a considerable time of the more volatile solvents in the mixture. This, of course, permits the solvent action of the light boiling solvent to act for a longer time and therefore more efficiently on the surface. The operator is thus permitted to cover a greater surface than he can ordinarily cover with one application of the old type of varnish and paint removers, thereby economizing both his time and the amount of solvent required. A paint remover compounded in accordance with my invention may be applied to the surface to be removed in the usual manner such as by spraying, brushing, dipping and the like.

In preparing the compositions of matter to be used as varnish removers, the substitution of beta-beta' dichlorethyl ether for the older high boiling inhibitors for the vaporization of the solvent used in the ordinary type of varnish removers greatly increases the efficiency of such composition. The inhibitors ordinarily used are, for example, paraffin, vegetable wax such as carnauba, ozokarite or the animal wax materials such as bees wax or the higher fatty acids. None of these solvent-vaporizing-inhibitors have any appreciable solvent action on the usual surface finishes. Beta-beta' dichlorethyl ether, on the other hand, while it has all the essential qualities for inhibiting the vaporization of the more volatile solvents, likewise has a decided solvent action on the surfaces being attacked.

As stated above, numerous varnish removing compositions may be employed by a mere substitution of the wax or paraffin contained therein by the solvent liquid beta-beta' dichlorethyl ether. The following composition, however, has proven very efficient and is but one of numeous examples which may be cited in the use of this solvent. A solvent mixture comprising 2½ parts of methyl alcohol, 2½ parts of acetone, 1 part of benzol and two parts of beta-beta' dichlorethyl ether is prepared by simply mixing the solvents together in a suitable vessel. The proportions in which these ingredients are added are not particularly critical, it being merely advisable that there be sufficient proportions of strong acting solvents to attack the surface and likewise sufficient beta-beta' dichlorethyl ether to hold the more volatile solvents in contact with the surface for a sufficient length of time for the efficient solvent action on the surface coating of the more volatile solvents.

To the solvent or surface finisher manufacturer various equivalents for the strong acting solvents will suggest themselves. The benzol, for example, may be substituted by any of the coal tar solvents such as naphthol, cresol, etc. or for that matter, even light boiling petroleum distillates. The acetone on the other hand may be replaced by other organic solvents, such as ethyl acetate, ethyl ether, chloroform, ethyl propionate, amyl alcohol etc. or similar acting organic solvents.

There are numerous other advantages, not above cited which are realized by using beta-beta'dichlorethyl ether as a substitute for waxes, paraffins and the like in varnish removers; for example, it has the additional advantage over paraffin that it will not "salt out" in the container as does paraffin if it be allowed to stand open and some of the more volatile constituents are permitted thereby to evaporate. In the employment of the wax containing varnish removers it is very essential that the last traces of the wax be removed from the surface prior to applying thereto a new surface coating. If this is not done, the new coating will not adhere firmly to the treated surface. On the other hand, with the use of beta-beta'dichlorethyl ether, it is not necessary that the last traces of the beta-beta'-dichlorethyl ether be removed from the treated surface prior to refinishing as it in no way prevents the adhesion to the surface of any of the usual protective coatings used, such, for example, as varnish, lacquers, gums, etc. In the application of cellulose derivative lacquers, either of the cellulose nitrate or cellulose acetate types, it is well known in the lacquer industry that substantially all of the paraffin must be removed from a surface prior to spraying or brushing with these lacquers.

If a lacquer is applied without the thorough removal of the wax, a complete curing of the cellulose acetate or cellulose nitrate lacquer layer is prevented, with the usual result that the surface must be again treated with a varnish remover and more thoroughly washed to free it from paraffin prior to the application of another finish coating. Such treatment, of course, is very expensive and is entirely avoided by the use of beta-beta'dichlorethyl ether, as the presence of this chemical does not prevent the curing of the cellulose derivative lacquers. Its thorough removal from the cleaned surface is not so essential.

From a consideration of the above disclosure, it will be realized that any varnish or paint remover containing beta-beta'dichlorethyl ether will come within the scope of this invention whether or not there are present therein waxes, paraffins, or similar acting materials in conjunction with the beta-beta'dichlorethyl ether.

What I claim as my invention and desire to be secured by Letters Patent of the United States is:

1. A composition of matter, for removing finish coatings, which contains beta-beta'dichlorethyl ether and an organic solvent having strong solvating action on the finish coating.

2. A composition of matter, for removing finish coatings, which contains beta-beta'dichlorethyl ether, acetone, methyl alcohol, and benzol.

3. A composition of matter, for removing finish coatings, which contains 2 parts of beta-beta'dichlorethyl ether, 2½ parts of acetone, 2½ parts of methyl alcohol and 1 part of benzol.

Signed at Rochester, New York, this 26th day of May, 1930.

DONALD F. OTHMER.